(12) United States Patent
Shriki

(10) Patent No.: US 12,480,614 B2
(45) Date of Patent: Nov. 25, 2025

(54) SUPPORT UNIT

(71) Applicant: Applied Materials Israel Ltd., Rehovot (IL)

(72) Inventor: Shahar Shriki, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 336 days.

(21) Appl. No.: 18/368,007

(22) Filed: Sep. 13, 2023

(65) Prior Publication Data

US 2025/0084954 A1   Mar. 13, 2025

(51) Int. Cl.
*F16M 11/04* (2006.01)
*G02B 7/182* (2021.01)

(52) U.S. Cl.
CPC .......... *F16M 11/046* (2013.01); *G02B 7/182* (2013.01)

(58) Field of Classification Search
CPC ...... F16M 11/046; F16M 11/14; G02B 7/182; H01J 37/20
USPC .................................................. 250/440.11
See application file for complete search history.

(56) References Cited

U.S. PATENT DOCUMENTS

| | | | | |
|---|---|---|---|---|
| 3,179,799 A | * | 4/1965 | Valdre | H01J 37/20 250/440.11 |
| 7,737,419 B2 | * | 6/2010 | Asano | G03F 7/70758 318/135 |
| 9,805,906 B1 | | 10/2017 | Vinnitsky et al. | |

* cited by examiner

*Primary Examiner* — Michael Maskell
(74) *Attorney, Agent, or Firm* — Kilpatrick Townsend & Stockton LLP

(57) ABSTRACT

A support unit for supporting a supported element, including (a) a spherical joint, (b) a pressure applying unit that is configured to maintain contact between a spherical outer surface and a base, (c) a position control unit that is configured to contact the spherical joint positioning element at multiple contact points and to set values of a first angle of rotation and a second angle of rotation of the spherical outer surface. The spherical joint is located above the position control unit. A distance between a fixed center of rotation and a point on the spherical outer surface is smaller than (b) a distance between the fixed center of rotation and any contact point of the multiple contact points.

17 Claims, 5 Drawing Sheets

SUPPORT UNIT

BACKGROUND OF THE INVENTION

Various systems include a tiltable mirror. The tiltable mirror is supported by a gimble mount. The tilt angle of the tiltable mirror is set by threaded elements that significantly extend to the side of the gimble mount and are located at the top of the gimble mount.

Such a gimble mount exhibits a high footprint and is not accurate.

There is a growing need to provide an accurate support unit that has a lower footprint.

BRIEF SUMMARY OF THE INVENTION

There is provided a support unit for supporting a supported element. The support unit includes a spherical joint, a pressure applying unit and a position control unit. The spherical joint includes a spherical outer surface and a base that comprises arcuate segments. The spherical outer surface is in mechanical communication with a spherical joint positioning element. The spherical joint defines a fixed center of rotation that is positioned above the support unit. The pressure applying is configured to maintain contact between the spherical outer surface and the base. The position control unit is configured to contact the spherical joint positioning element at multiple contact points and to (a) set a value of a first angle of rotation of the spherical outer surface about a first axis, and (b) set a value of a second angle of rotation of the spherical outer surface about a second axis that is oriented to the first axis. The spherical joint is located above the position control unit. A distance between the fixed center of rotation and a point on the spherical outer surface is smaller than a distance between the fixed center of rotation and any contact point of the multiple contact points.

BRIEF DESCRIPTION OF THE DRAWINGS

The subject matter regarded as the embodiment is particularly pointed out and distinctly claimed in the concluding portion of the specification. The embodiment, however, both as to organization and method of operation, together with specimen s, features, and advantages thereof, may best be understood by reference to the following detailed description when read with the accompanying drawings in which:

Figure 1:
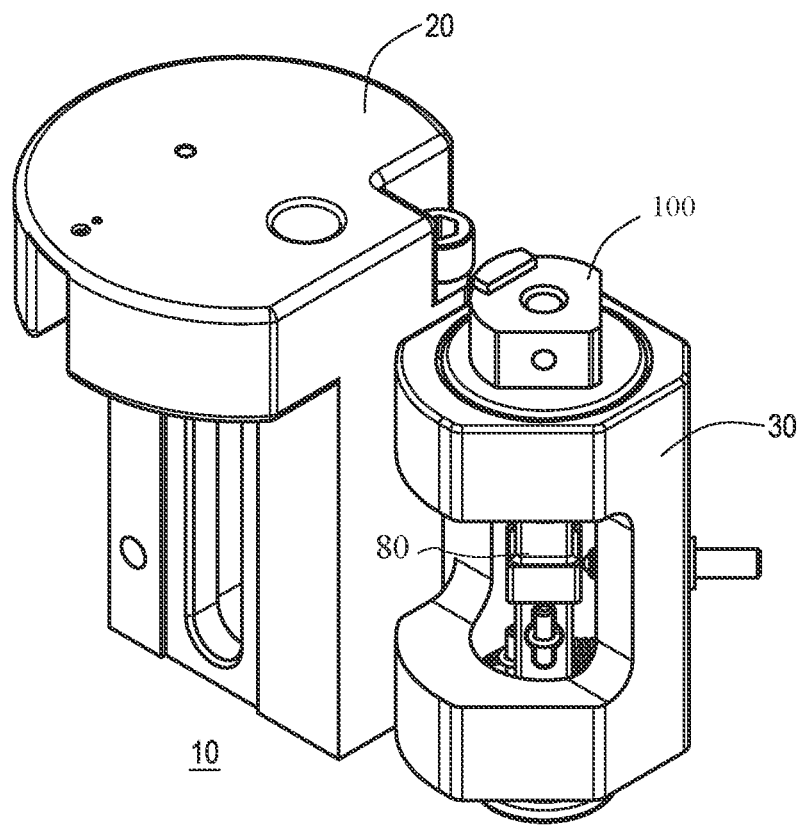
FIG. 1 illustrates an example of a reference mechanical element, a housing, and a body.
Figure 2:
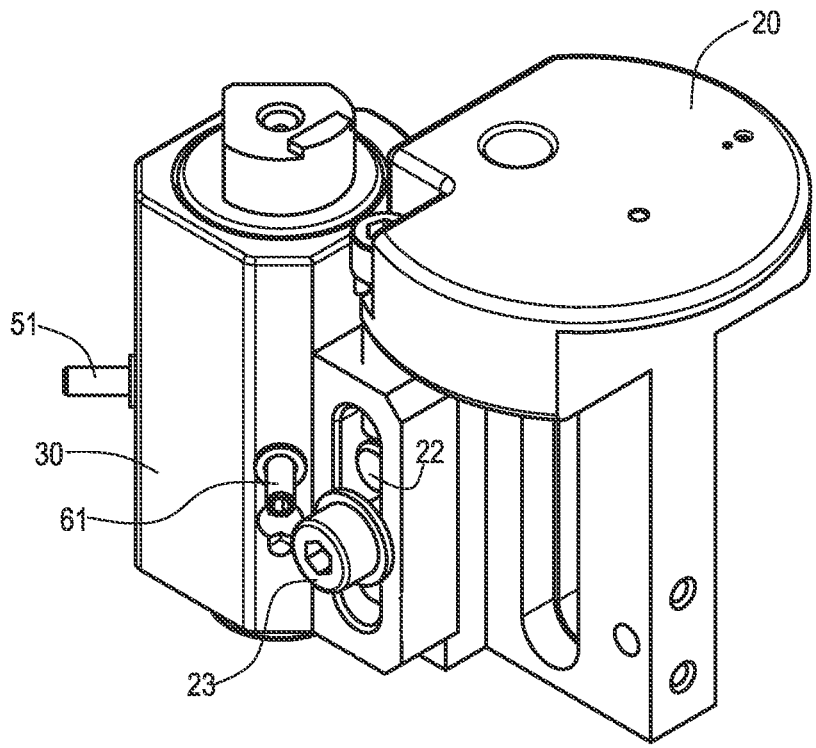
FIG. 2 illustrates an example of a reference mechanical element, a housing, and a body.
Figure 3:
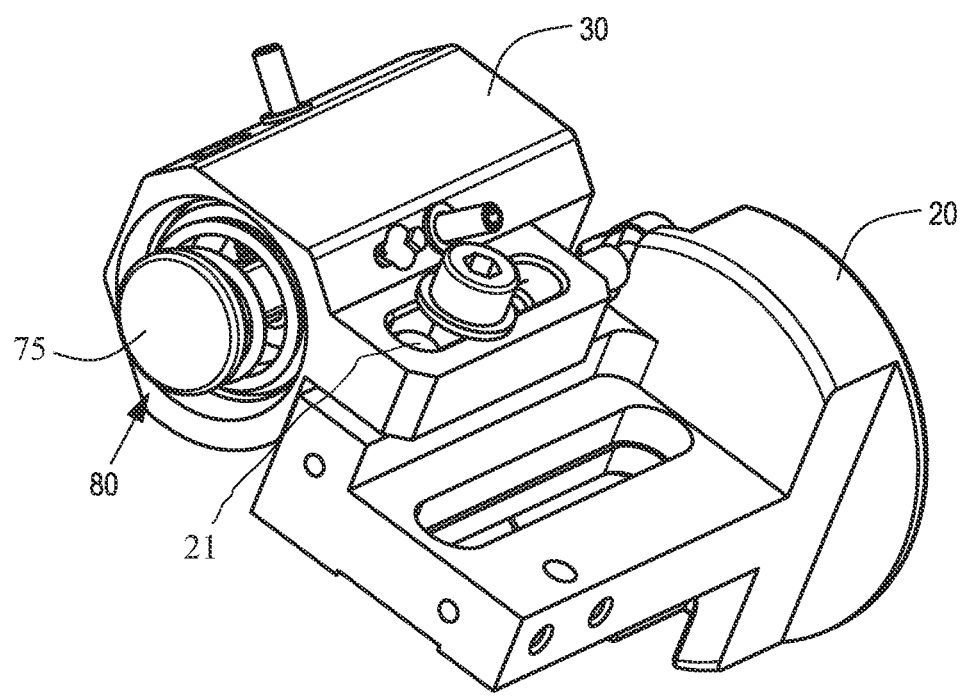
FIG. 3 illustrates an example of a reference mechanical element, a housing, and a body.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

According to an embodiment, there is provided a support unit that includes a spherical joint that defines a fixed center of rotation that may correspond to a certain point of a supported element.

The support unit allows to rotate the supported element along different rotational axes without elevating a certain point of the supported element.

The rotation sets the tilt of the upper surface of the supported unit.

The setting of the tilt is done with high precision as the rotation of the spherical joint is set by a position control unit by contacting a spherical joint positioning element at one or more contact locations that are below a base of the spherical joint.

According to an embodiment, the distance between a spherical outer surface of the spherical joint and the one or more contact locations may exceed by a factor of at least 1.5, 2, 3, 4, and more than a radius that has a length that equals the distance between the fixed center of rotation and points on the spherical outer surface.

The position control unit may be located below the position control unit—and this reduces the footprint of the support unit. An elements of a position control unit may extend by up to a few millimeters (for example up to 2-4 centimeters) to the side and the extension is made in a lower plane than the plane of the supported element—wherein the lower plane is less crowded.

According to an embodiment the height of the spherical joint is set in an accurate manner.

According to an embodiment, the supported element is a part of the support unit or is integrated with the support unit.

According to an embodiment, the supported unit is a measurement target of a substrate evaluation system. Examples of substrate evaluation systems include (i) defect review systems such as a defect review scanning electron microscope SEMVISION™ of APPLIED MATERIALS™ Inc. of San Jose, California, (ii) a metrology system such as the PROVision™ 3E Ebeam™ metrology system of APPLIED MATERIALS™, (iii) an electron beam inspection system such as the PRIMEVISION™ of APPLIED MATERIALS™, or (iv) a critical dimension scanning electron microscope such as the VERITYSEM™ of APPLIED MATERIALS™, and the like. The charge particle evaluation system may manufactured by vendors such as HITACHI™ of Tokyo, Japan, or KLA™ Corporation of Milpitas, California, or may be manufactured by other vendors.

FIGS. 1, 2, 3, 5 and 8 illustrate examples of reference mechanical element 20, housing 30, and body 80.

Figure 4:
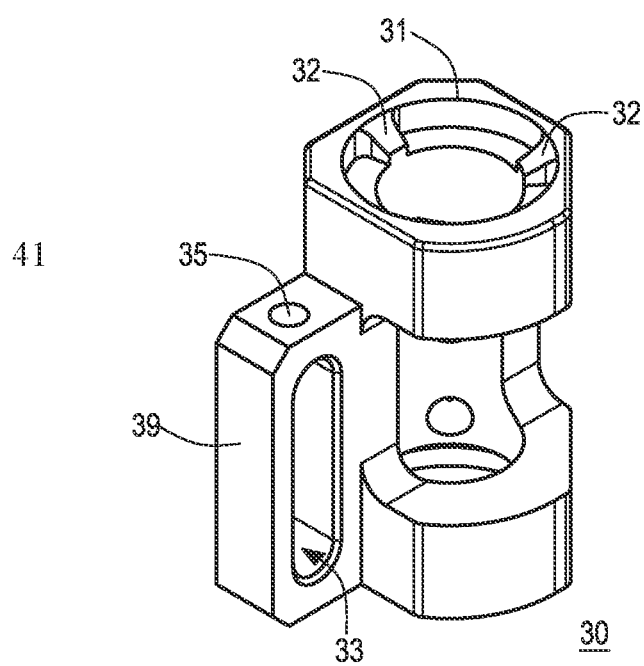
FIG. 4 illustrates an example of a housing.
Figure 5:
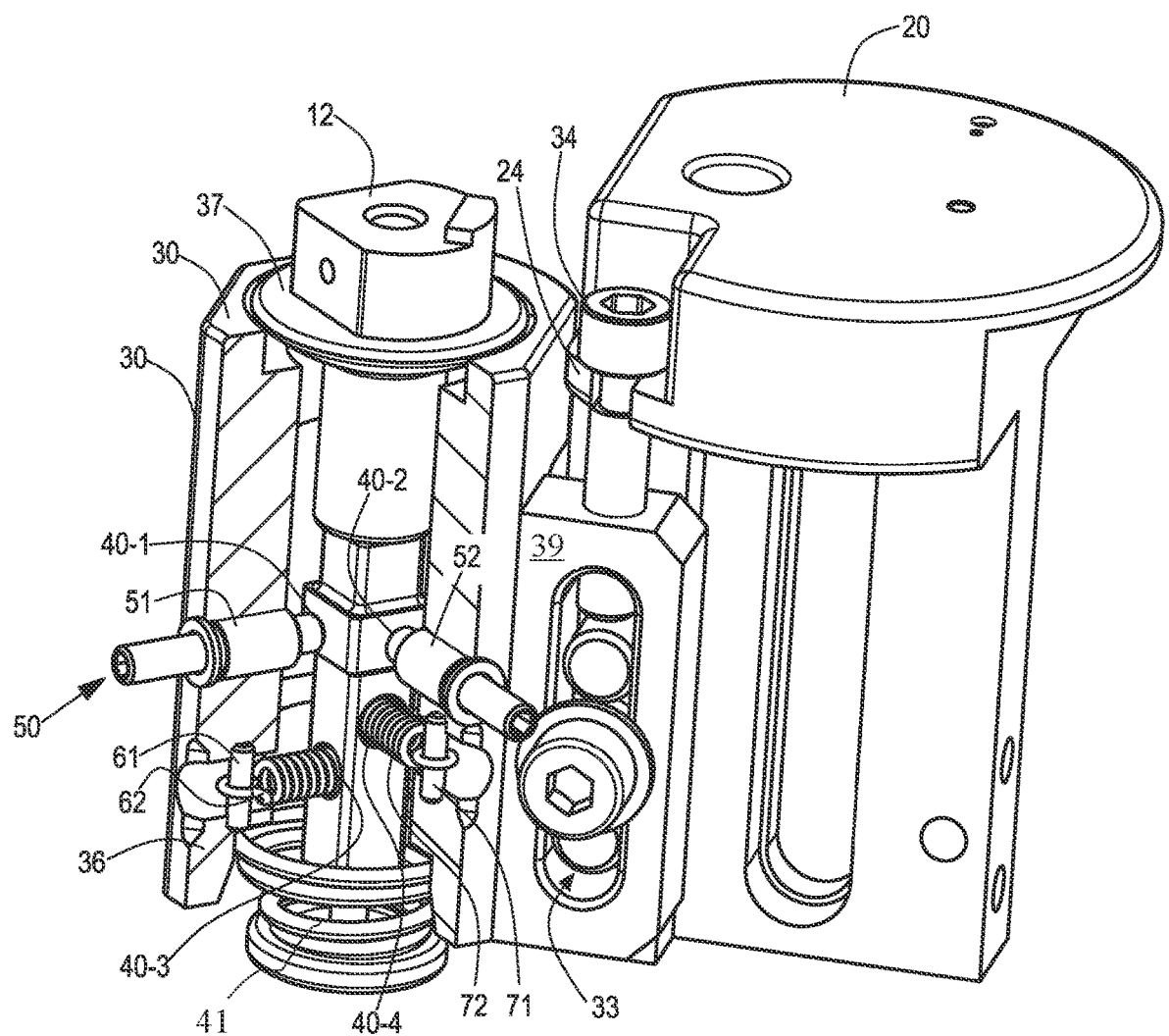
FIG. 5 illustrates an example of a reference mechanical element, a housing, and a body.

FIG. 4 illustrates an example of housing 30.

Figure 6:
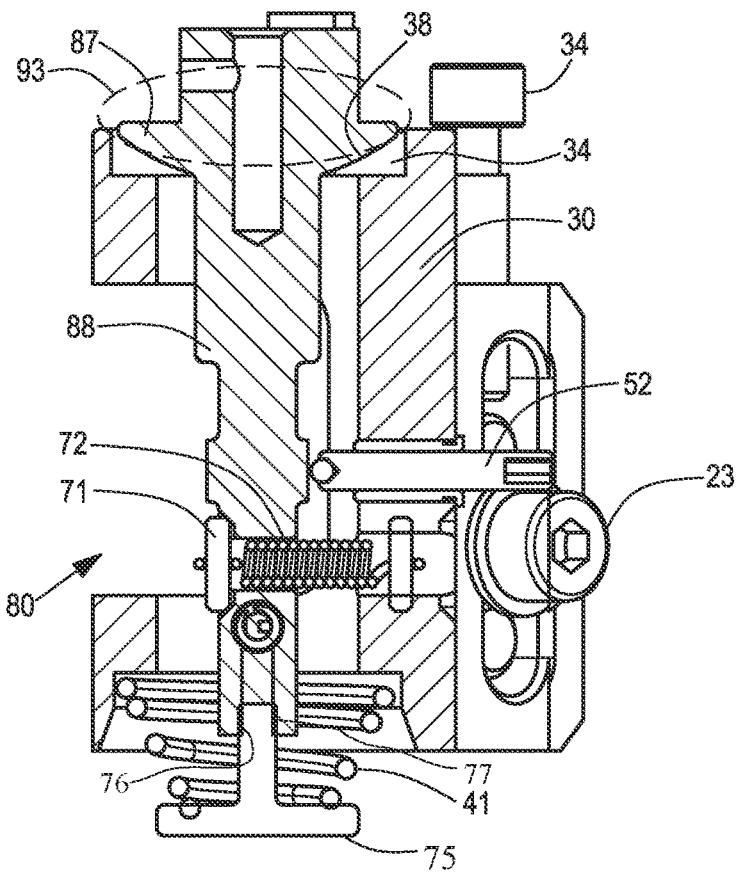
FIG. 6 illustrates an example of a housing and a body.
Figure 7:
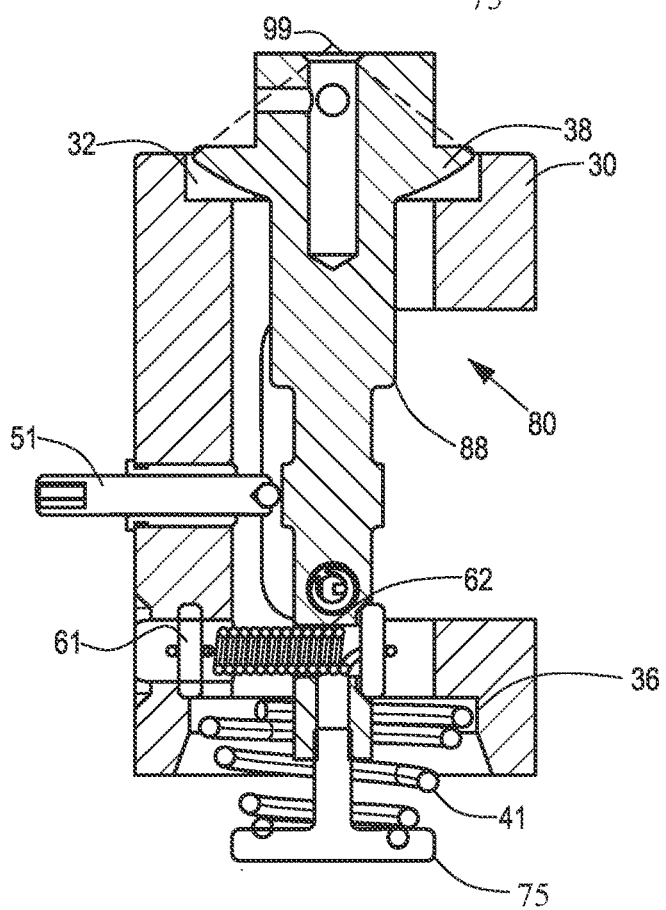
FIG. 7 illustrates an example of a housing and a body.
Figure 8:
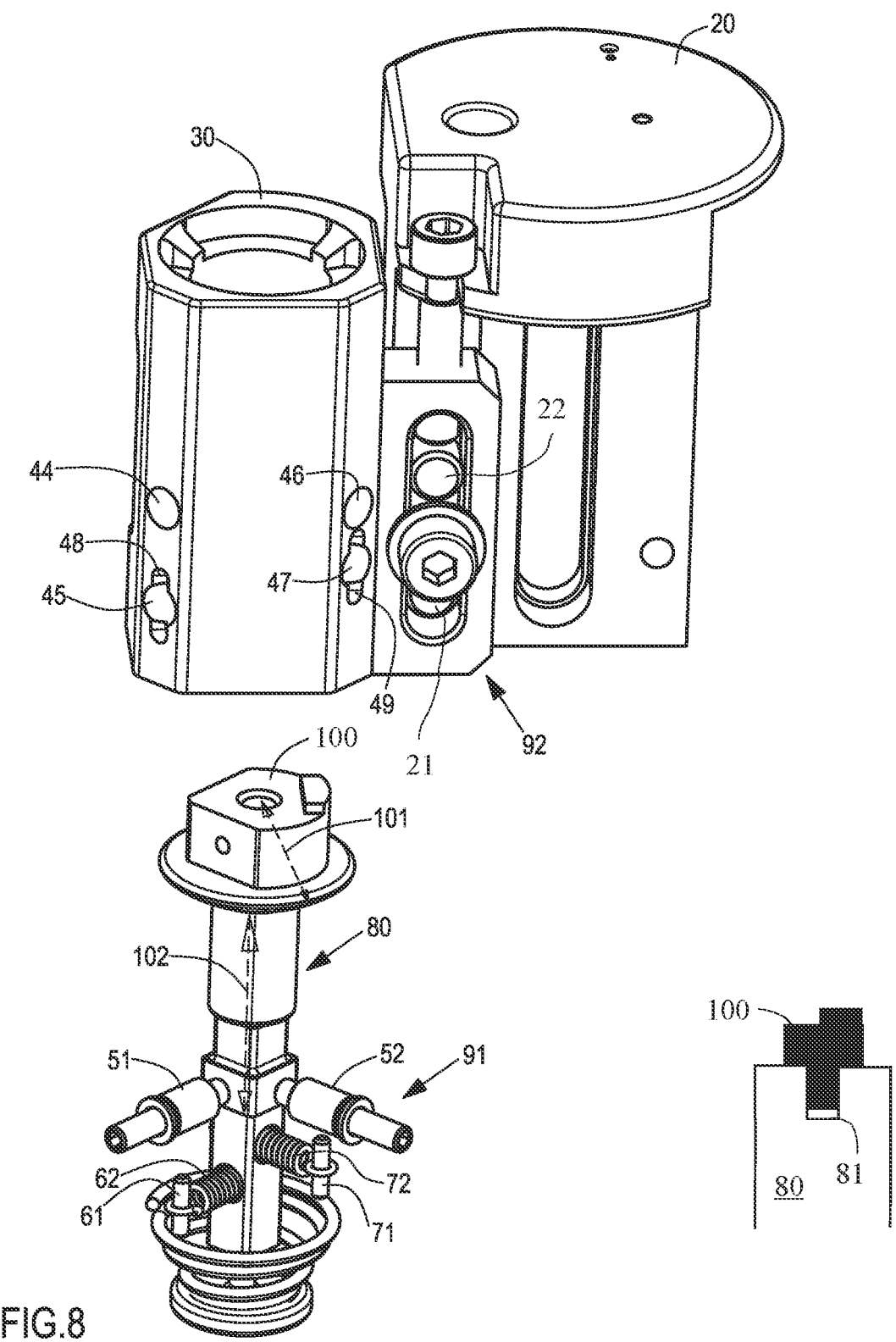
FIG. 8 illustrates an example of a reference mechanical element, a housing, and a body.

FIGS. 6 and 7 illustrate examples of housing 30 and body 80.

The body and/or housing 30 are movable in relation to the reference mechanical element, which may be static or movable.

Support unit 10 is configured to support supported element 100.

According to an embodiment, the support unit 10 includes a spherical joint that includes a spherical outer surface 38 and a base 31 that includes arcuate segments 32.

The arcuate segments 32 may be spaced apart to each other or may be in contact with each other.

The upper part of the exterior of the arcuate segments form parts of a virtual sphere that matches the spherical outer surface. The spherical outer surface 38 is defined by a radially symmetrical perturbation 37 of body 80.

According to an embodiment, the spherical outer surface 38 is in mechanical communication with a spherical joint positioning element 88. In FIGS. 1-8 the body 80 includes spherical outer surface 38 and spherical joint positioning element 88 that is located below the spherical outer surface 38. It should be noted that spherical joint positioning element 88 may be connected to the to the spherical outer surface 38 or rigidly attached to the spherical outer surface 38.

The spherical joint defines a fixed center of rotation 99 that is positioned above the support unit.

According to an embodiment, the support unit includes a pressure applying unit that is configured to maintain contact between the spherical outer surface and the base.

In FIGS. 6-7 the pressure applying unit includes spherical joint related spring 41 that is pressed against a spring interface 36 of the housing. The joint related spring is also pressed against a spring base 75 that has a threaded end 76 that fits an inner thread 77 of body 80. A rotation of the spring base determines the distance between an end of the joint related spring and the spherical joint. The distance may be adjusted, for example, to prevent an irregular movement (jump) formed when a static tension between the joint related spring and the spherical joint is converted to a dynamic tension.

According to an embodiment, the support unit includes a position control unit (denoted 91 in FIG. 8) that is configured to contact the spherical joint positioning element at multiple contact points (such as connection points 40-1, 40-2, 40-3 and 40-4 of FIG. 5), to set a value of a first angle of rotation of the spherical outer surface about a first axis, and to set a value of a second angle of rotation of the spherical outer surface about a second axis that is oriented to the first axis.

In FIGS. 1-8 the first axis is perpendicular to the second axis but other angular relationships may be provided.

According to an embodiment, the support unit includes a supported element interface (denoted 81 in FIG. 8) for supporting the supported element. Alternatively, the supported element belong to the support unit, for example, is integrated with a body of the support unit.

According to an embodiment, wherein the spherical joint is above the position control unit.

According to an embodiment, the distance (denoted 102 of FIG. 8) between a spherical outer surface of the spherical joint and the one or more contact locations may exceed (by a factor of at least 1.1, 1.5, 2, 3, 4, 5 and even more) a radius (denoted 101 in FIG. 8) that has a length that equals the distance between the fixed center of rotation and points on the spherical outer surface.

According to an embodiment, the position control unit includes a first angle of rotation controller that includes a first adjustable element 51 that is configured to set the value of the first angle or rotation.

According to an embodiment, the first adjustable element is an actuator or a motor for moving the spherical joint positioning element. The first adjustable element may be configured to move in relation to the housing and change the first axis of rotation.

According to an embodiment, the first angle of rotation controller further includes a first spring 62 that is configured to maintain contact between the first adjustable element and the body—by pressing the body against the first adjustable element 51. The first spring is held by a first spring holder 61.

According to an embodiment, the spring holder 61 is pressed against a first recess 48 formed in housing 30.

According to an embodiment, the first spring passes through first spring opening 45 that is formed in the housing 30.

According to an embodiment, the first recess 48 extends from both sides of the first spring opening 45.

According to an embodiment, the first adjustable element passes through the first opening 44 formed in the housing.

According to an embodiment, the position control unit includes a second angle of rotation controller that includes a second adjustable element 51 that is configured to set the value of the second angle or rotation.

According to an embodiment, the second adjustable element is an actuator or a motor for moving the spherical joint positioning element. The second adjustable element may be configured to move in relation to the housing and change the second axis of rotation.

According to an embodiment, the second angle of rotation controller further includes a second spring 72 that is configured to maintain contact between the second adjustable element and the body—by pressing the body against the second adjustable element 52. The second spring is held by a second spring holder 71.

According to an embodiment, the second spring passes through second spring opening 47 that is formed in the housing 30.

According to an embodiment, the second spring holder 71 is pressed against a second spring recess 49 formed in housing 30.

According to an embodiment, the second spring recess 49 extends from both sides of the second spring opening 47.

According to an embodiment, the second adjustable element passes through second opening 46 formed in the housing.

FIGS. 1-8 illustrates an embodiment in which the base belongs to the housing that surrounds the body, the spring holders are held by the housing, the first adjustable element and the second adjustable element are accessible via openings formed in the housing.

According to an embodiment, the first adjustable element and the second adjustable element partially extend outside the openings.

According to an embodiment, the first adjustable element and the second adjustable element are located at (the same) first distance from the fixed center of rotation, and the first spring and the second spring are located at (the same) second distance from the fixed center of rotation. The first distance may differ from the second distance or may equal the second distance.

According to an embodiment, the support unit includes a height control unit (denoted 92 in FIG. 8) configured to control the height of the spherical joint.

According to an embodiment, the height control unit includes a height setting window 33 that is vertically movable in relation to the reference mechanical element and also prevents transversal movement of the support unit and the reference mechanical element 20. The traversal movement is prevented even during an adjustment of the height of the support unit.

According to an embodiment, the third adjustable element 34 is provided and includes a bolt that has an external thread that fits with an internal thread of a top opening 35 formed in a planar wall 39. Planar wall 39 extends to the side of the housing, the planar wall includes height setting window 33.

According to an embodiment, a clockwise (or counterclockwise) rotation of the third adjustable element 34 about a first rotational direction is translated to an elevation of the housing, and a counterclockwise (or clockwise) rotation of the third adjustable element 34 is translated to a lowering of the housing.

The height control unit is configured to set the height of the spherical joint by setting a height difference between the opening and the reference mechanical element.

According to an embodiment, the height setting window 33 is configured to interface with a portion of the reference mechanical element, wherein a width of the height setting window equals a width of perturbations 21 and 22 of the portion of the reference mechanical element.

According to an embodiment, the support unit includes the reference mechanical element.

According to an embodiment, the fixed center of rotation is located at a point of an outer surface of the supported element, when the supported element is supported by the support unit.

For example—the point of the outer surface may be a center of an upper surface of the supported element or any other point of interest of the supported element.

In the foregoing description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a support unit should be applied mutatis mutandis to a method that may be executed by the support unit.

The term "and/or" means additionally or alternatively. For example, A and/or B means only A, or only B or A and B.

In the foregoing specification, the embodiments of the disclosure have been described with reference to specific examples of embodiments. It will, however, be evident that various modifications and changes may be made therein without departing from the broader spirit and scope of the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

Any reference to the term "comprising" or "having" or "including" should be applied mutatis mutandis to "consisting" and/or should be applied mutatis mutandis to "consisting essentially of".

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiment.

What is claimed is:

1. A support unit for supporting a supported element, comprising:
   a spherical joint that comprises a spherical outer surface and a base that comprises arcuate segments, wherein the spherical outer surface is in mechanical communication with a spherical joint positioning element and wherein the spherical joint defines a fixed center of rotation that is positioned above the support unit;
   a pressure applying unit configured to maintain contact between the spherical outer surface and the base;
   a position control unit configured to contact the spherical joint positioning element at multiple contact points and to (a) set a value of a first angle of rotation of the spherical outer surface about a first axis, and (b) set a value of a second angle of rotation of the spherical outer surface about a second axis that is oriented to the first axis; and
   wherein the spherical joint is located above the position control unit; and
   wherein a distance between the fixed center of rotation and a point on the spherical outer surface is smaller than a distance between the fixed center of rotation and any contact point of the multiple contact points.

2. The support unit according to claim 1, wherein the distance between the fixed center of rotation and the point on the spherical outer surface is smaller than one half of the distance between the fixed center of rotation and any contact point of the multiple contact points.

3. The support unit according to claim 1, wherein the spherical outer surface and the spherical joint positioning element are parts of a body.

4. The support unit according to claim 3, wherein the pressure applying unit comprises a spherical joint related spring that is pressed against a spring interface of a housing.

5. The support unit according to claim 3, wherein the position control unit comprises:
   a first angle of rotation controller that comprises a first adjustable element that is configured to set the value of the first angle or rotation; and
   a second angle of rotation controller that comprises a second adjustable element that is configured to set the value of the second angle or rotation.

6. The support unit according to claim 5, wherein:
   the first angle of rotation controller further comprises a first spring that is configured to maintain contact between the first adjustable element and the body;
   the second angle of rotation controller further comprises a second spring that is configured to maintain contact between the second adjustable element and the body.

7. The support unit according to claim 6, wherein the first spring and the second spring are held on by side by spring holders.

8. The support unit according to claim 7, wherein the base belongs to a housing that surrounds the body, wherein the spring holders are held by the housing and wherein the first adjustable element and the second adjustable element are accessible via openings formed in the housing.

9. The support unit according to claim 6, wherein the first adjustable element and the second adjustable element are located above the first spring and the second spring.

10. The support unit according to claim 9, wherein the first adjustable element and the second adjustable element are located at a first distance from the fixed center of rotation, and wherein the first spring and the second spring are located at a second distance from the fixed center of rotation.

11. The support unit according to claim 1 further comprising a height control unit configured to control a height of the spherical joint.

12. The support unit according to claim 11, wherein the height control unit comprises an height setting window that prevents transversal movement of the support unit and a third adjustable element that is configured to set the value of the height of the spherical joint.

13. The support unit according to claim 12, wherein the height control unit is configured to interface with a reference mechanical element and to set the height of the spherical joint by setting a height difference between the height setting window and the reference mechanical element.

14. The support unit according to claim 13, wherein the height setting window is configured to interface with a portion of the reference mechanical element, and wherein a width of the height setting window equals a width of perturbations of the portion of the reference mechanical element.

15. The support unit according to claim 14, wherein the height control unit comprises a thread that fits with a corresponding thread of the reference mechanical element.

16. The support unit according to claim 13 further comprising the reference mechanical element.

17. The support unit according to claim 1, wherein the fixed center of rotation is located at a point of an outer surface of the supported element, when the supported element is supported by the support unit.

* * * * *